United States Patent
Benkreira et al.

(10) Patent No.: US 10,825,003 B2
(45) Date of Patent: Nov. 3, 2020

(54) METHOD AND SYSTEM FOR LARGE TRANSFER AUTHENTICATION

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/199,770

(22) Filed: Nov. 26, 2018

(65) Prior Publication Data

US 2020/0167744 A1    May 28, 2020

(51) Int. Cl.
*G06Q 40/00* (2012.01)
*G06Q 20/10* (2012.01)
*G06Q 20/40* (2012.01)
*G06Q 20/32* (2012.01)

(52) U.S. Cl.
CPC ..... *G06Q 20/1085* (2013.01); *G06Q 20/3224* (2013.01); *G06Q 20/4012* (2013.01); *G06Q 20/40145* (2013.01)

(58) Field of Classification Search
CPC combination set(s) only.
See application file for complete search history.

(56) References Cited

U.S. PATENT DOCUMENTS

| 6,505,165 B1* | 1/2003 | Berstis | G01C 21/26 340/990 |
| 7,040,533 B1* | 5/2006 | Ramachandran | G06K 7/0004 235/379 |
| 2005/0269402 A1* | 12/2005 | Spitzer | G07F 7/0886 235/380 |

(Continued)

OTHER PUBLICATIONS

Scarfo, Phil (Biometrics: The key to secure, convenient ATM transactions; https://www.atmmarketplace.com/articles/biometrics-the-key-to-secure-convenient-atm-transactions/; Aug. 20, 2015) (Year: 2015).*

*Primary Examiner* — Sarah M Monfeldt
*Assistant Examiner* — Mark H Gaw
(74) *Attorney, Agent, or Firm* — DLA Piper LLP (US)

(57) ABSTRACT

Embodiments disclosed herein generally related to a system and method for authenticating a transfer request. A computing system receives a transfer request from a client device. The computing system determines that the monetary amount specified in the transfer request exceeds a threshold. The computing system identifies an automated teller machine (ATM) based on at least location information associated with a user of the client device. The computing system prompts the user to authenticate the transfer request at the identified ATM by transferring a message to the client device to be displayed thereon. The computing system receives an authentication attempt of the user from the ATM. The computing system compares authentication information in the authentication attempt to personal identification information associated with the user. The computing system determines that the authentication information at least partially matches personal identification information associated with the user. The computing system processes the transfer request.

12 Claims, 6 Drawing Sheets

(56) References Cited

U.S. PATENT DOCUMENTS

| | | | |
|---|---|---|---|
| 2007/0203835 A1* | 8/2007 | Cai | G06Q 20/1085 |
| | | | 705/43 |
| 2011/0032198 A1* | 2/2011 | Miyazawa | G06F 3/0416 |
| | | | 345/173 |
| 2013/0124411 A1* | 5/2013 | Kobres | G07F 19/20 |
| | | | 705/43 |
| 2016/0078430 A1* | 3/2016 | Douglas | H04L 63/08 |
| | | | 705/43 |

\* cited by examiner

METHOD AND SYSTEM FOR LARGE TRANSFER AUTHENTICATION

FIELD OF THE DISCLOSURE

The present disclosure generally relates to a method and a system for authenticating a transfer request.

BACKGROUND

Conventional financial accounts typically allow a user to transfer money from an account associated with the user to a financial account of a third party individual. For example, users can typically log-on to their financial institution's webpage and facilitate a transfer of funds to a third party account by merely providing an address to which the funds are to be transmitted. Although the ease by which users may transfer funds may be desirable, the downfalls of such functionality are ever as prevalent. For example, should the user's account become compromised, a fraudulent third party may have unfettered access to the funds in the user's account. Further, reversing such transfers prove to be increasingly more difficult, if not nearly impossible. Accordingly, conventional financial systems suffer from failing to provide one or more additional safeguards in such transfer scenarios.

SUMMARY

Embodiments disclosed herein generally related to a system and method for authenticating a transfer request. In one embodiment, a method of authenticating a transfer request is disclosed herein. A computing system receives a transfer request from a client device. The transfer request includes an originating account, a target account, and a monetary amount to be transferred from the originating account to the target account. The computing system determines that the monetary amount specified in the transfer request exceeds a threshold. The computing system identifies an automated teller machine (ATM) based on at least location information associated with a user of the client device. The computing system prompts the user to authenticate the transfer request at the identified ATM by transferring a message to the client device to be displayed thereon. The computing system receives an authentication attempt of the user from the ATM. The computing system compares authentication information in the authentication attempt to personal identification information associated with the user. The computing system determines that the authentication information at least partially matches personal identification information associated with the user. Based on the determining, the computing system processes the transfer request.

In some embodiments determining, by the computing system, that the monetary amount specified in the transfer request exceeds the threshold includes the computing system referencing one or more preferences stored in an account of the user, identifying that the user has specified the threshold for all transfer requests, and comparing the monetary amount specified in the transfer request to the threshold.

In some embodiments, identifying, by the computing system, the ATM based on at least the location information associated with the user of the client device includes the computing system referencing one or more preferences stored in an account of the user, identifying that the user has specified the ATM as a preferred authentication ATM, and selecting the specified ATM as the ATM.

In some embodiments, identifying, by the computing system, the ATM based on at least the location information associated with the user of the client device includes the computing system identifying address information associated with the user, querying a database to identify one or more candidate ATMs proximate to the identified address information, and selecting a candidate ATM of the one or more candidate ATMs as the ATM.

In some embodiments, identifying, by the computing system, the ATM based on at least the location information associated with the user of the client device includes the computing system selecting an initial ATM as the ATM based on at least one of a user's preference or address information associated with the user, prompting the client device to share a current location of the client device, receiving the current location of the client device, determining that the current location of the client device is outside of a predefined radius centered about a location of the user's preference or the address information associated with the user, analyzing one or more locations associated with one or more transactions of the user to generate a confidence factor, determining that the confidence factor is greater than a predetermined threshold, and modifying the initial ATM to an updated ATM proximate to the current location of the client device.

In some embodiments, receiving, by the computing system, the authentication attempt of the user from the ATM includes the computing system receiving one or more streams of image data captured by a camera of the ATM.

In some embodiments, comparing, by the computing system, the authentication information in the authentication attempt to the personal identification information associated with the user includes the computing system identifying one or more facial features of the user in the one or more streams of data and comparing the one or more facial features in the one or more streams of data to one or more facial features stored in a user account.

In some embodiments, receiving, by the computing system, the authentication attempt of the user from the ATM includes the computing system receiving biometric information captured by a biometric reader of the ATM.

In some embodiments, comparing, by the computing system, the authentication information in the authentication attempt to the personal identification information associated with the user includes the computing system comparing the biometric information captured by the biometric reader to biometric information stored in a user account.

In another embodiment, a system is disclosed herein. The system includes a processor and a memory. The processor is in communication with a client device associated with a user and one or more automated teller machines (ATMs). The memory has programming instructions stored thereon, which, when executed by the processor, performs an operation. The operation includes receiving a transfer request from the client device. The transfer request includes an originating account, a target account, and a monetary amount to be transferred from the originating account to the target account. The operation further includes identifying an ATM of the one or more ATMs based on at least location information associated with the user of the client device. The operation further includes prompting the user to authenticate the transfer request at the identified ATM by transferring a message to the client device to be displayed thereon. The operation further includes receiving an authentication attempt of the user from the ATM. The operation further includes comparing authentication information in the authentication attempt to personal identification information associated with the user. The operation further includes determining that the authentication information at least partially matches personal identification information associated with the user. The operation further includes processing the transfer request based on the determining.

In some embodiments, identifying the ATM based on at least the location information associated with the user of the client device includes referencing one or more preferences stored in an account of the user, identifying that the user has specified the ATM as a preferred authentication ATM, and selecting the specified ATM as the ATM.

In some embodiments, identifying the ATM based on at least the location information associated with the user of the client device includes identifying address information associated with the user, querying a database to identify one or more candidate ATMs proximate to the identified address information, and selecting a candidate ATM of the one or more candidate ATMs as the ATM.

In some embodiments, identifying the ATM based on at least the location information associated with the user of the client device includes selecting an initial ATM as the ATM based on at least one of a user's preference or address information associated with the user, prompting the client device to share a current location of the client device, receiving the current location of the client device, determining that the current location of the client device is outside of a predefined radius centered about a location of the user's preference or the address information associated with the user, analyzing one or more locations associated with one or more transactions of the user to generate a confidence factor, determining that the confidence factor is greater than a predetermined threshold, and modifying the initial ATM to an updated ATM proximate to the current location of the client device.

In some embodiments, receiving the authentication attempt of the user from the ATM includes receiving one or more streams of image data captured by a camera of the ATM.

In some embodiments, comparing the authentication information in the authentication attempt to the personal identification information associated with the user includes identifying one or more facial features of the user in the one or more streams of data and comparing the one or more facial features in the one or more streams of data to one or more facial features stored in a user account.

In some embodiments, the authentication attempt of the user from the ATM includes receiving biometric information captured by a biometric reader of the ATM.

In some embodiments, comparing the authentication information in the authentication attempt to the personal identification information associated with the user includes comparing the biometric information captured by the biometric reader to biometric information stored in a user account.

In another embodiment, a method of authenticating a transfer request is disclosed herein. A client device transfers a transfer request to a computing system. The transfer request includes an originating account, a target account, and a monetary amount to be transferred from the originating account to the target account. The client device receives, from the computing system, a first notification message. The first notification message includes an authentication request for a user of client device to authenticate the transfer request at a specified automated teller machine (ATM). The client device generates a first graphical user interface (GUI) comprising the first notification message. The client device displays the first GUI via a display of the client device. The client device receives, via the first GUI, an input corresponding to an acceptance of the authentication request. The client device transmits the input to the computing system. The client device receives, from the computing system, a second notification message. The second notification message includes a confirmation of the transfer request based on a successful authentication of the user. The client device generates a second GUI. The second GUI includes the second notification message. The client device displays the second GUI via the display of the client device.

In some embodiments, first GUI includes an acceptance button and deny button. The acceptance button corresponding to an acceptance of the authentication request. The deny button correspond to a denial of the authentication request.

In some embodiments, the client device receives a request to share a current location. The client device transmits, to the computing system, the current location of the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein are generally directed to a method and a system for authenticating a transfer request. In conventional systems, a user is typically able to log-on to his or her account and facilitate a transfer from an account associated with the user to an account associated with a third party. Once the user presses submit, the transfer is initiated, and reversal of such transfer is conventionally difficult, if not near impossible to reverse. Accordingly, should the user's account become compromised (i.e., a fraudulent individual gains access to the user's account), funds from the user's account may be transferred to third party accounts without any approval from the user.

The one or more techniques disclosed herein provide a solution to the above scenario by requiring a further authentication of transfer requests from user accounts associated with a particular organization. For example, the organization may require the user to further authenticate any transaction that exceeds a threshold amount of funds. In another example, the user may pre-designate a threshold amount, such that any transfer request above the threshold amount triggers a further authentication. The organization may prompt the user to authenticate him or herself at an ATM selected by the organization. For example, the organization may instruct the user to navigate to a particular ATM and provide one or more credentials thereto as a means of further authentication. Accordingly, the above process eliminates or reduces the possibility of a fraudulent third party gaining access to the user's account and transferring funds therefrom by requiring the user to follow a specific set of rules or steps to further authenticate the transfer.

Further, the above process may be used as an additional security check for various high risk scenarios. Exemplary high risk scenarios may include, but are not limited to, adding an authorized user to an account, closing an account, changing an address on an account, transferring credit card rewards to an external account, assigning a beneficiary to any kind of deposit account (e.g., savings, investment, certificate of deposit, etc.), and/or requesting sensitive documents.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
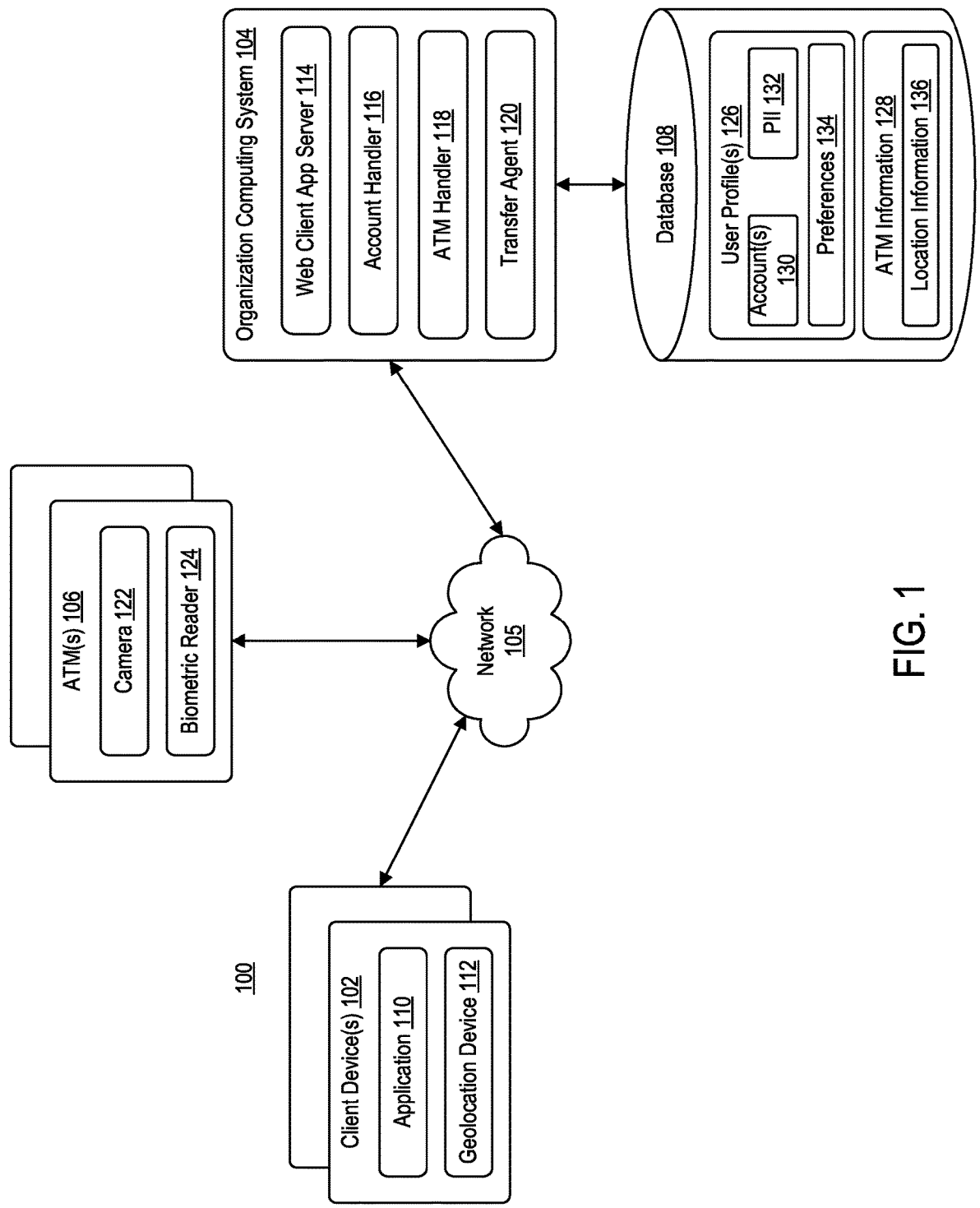
FIG. 1 is a block diagram illustrating a computing environment, according to one exemplary embodiment.

FIG. 1 is a block diagram illustrating a computing environment 100, according to one embodiment. Computing environment 100 may include at least one or more client devices 102, an organization computing system 104, and one or more automated teller machines (ATMs) 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Client device 102 may be operated by a user (or customer). For example, client device 102 may be a mobile device, a tablet, a desktop computer, or any computing system having the capabilities described herein. Client device 102 may belong to or be provided to a customer (e.g., user 101) or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 110 and geolocation agent 112. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 110 for display through a graphical user interface (GUI) of client device 102.

Geolocation agent 112 may be one or more software modules. The one or more software modules are collections of signals stored on a media (e.g., memory of client device 102) that represent a series of machine instructions (e.g., program code) that implements one or more algorithmic steps. Such machine instructions may be the actual computer code the processer of client device 102 interprets to implement the instructions, or, alternatively, may be a higher level coding of the instructions that is interpreted to obtain the actual computer code. The one or more software modules may also include one or more hardware components. One or more aspects of the algorithm may be performed by the hardware components (e.g., circuitry) itself, rather as a result of an instruction.

Geolocation agent 112 may be configured to track a location of client device 102. For example, when enabled, geolocation agent 112 may utilize one or more global positioning system (GPS) modules to identify a current location of client device 102.

In operation, a user via client device 102 may interact with organization computing system 104 to initiate a transfer request from an account associated with the user to an account of a third party. For example, a user, via application 110, may be able to access an account handled by organization computing system 104 to transfer funds to another individual.

Organization computing system 104 may include at least an account handler 116, an ATM handler 118, and a transfer agent 120. Each of account handler 116, ATM handler 118, and transfer agent 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Transfer agent 120 may be configured to manage one or more transfer requests received from one or more client devices 102. For example, transfer agent 120 may be configured to facilitate the transfer of funds from a user's account to a third party. Generally, a transfer request may include an account of the transferor, an account of the transferee, and an amount to be transferred. In some embodiments, transfer agent 120 may be configured to determine if the amount to be transferred is greater than a threshold mount. For example, the threshold amount may be an amount predesignated by an organization associated with organization computing system or an amount predesignated by the transferor. If transfer agent 120 determines that the amount to be transferred is greater than the threshold amount, organization computing system 104 may instruct the transferor to authenticate the transfer request. For example, organization computing system 104 may instruct the transferor to proceed to an ATM to authenticate the transfer. In some embodiments, transfer agent 120 may factor one or more parameters into the determination. For example, transfer agent 120 may adjust the threshold amount based on whether the transfer is an external bank transfer (high risk scenario) or an internal bank transfer (lower risk transfer), whether the transfer is a real-time transfer (high risk scenario) or an automated clearing house transfer (lower risk scenario). Further, in some embodiments, transfer agent 120 may adjust the threshold amount based on the party to which transferor is attempting the transfer. For example, transfer agent 120 may adjust the threshold amount if there is a fraud indicator on the recipient, if the recipient is a new party to which transferor is transferring funds, and the like. In some embodiments, transfer agent 120 may adjust the threshold amount based on a number of transfers made by the transferor in a pre-defined duration (e.g., numerous transfers in a small duration being indicative of possible fraud).

ATM handler 118 may be configured to identify an ATM at which transferor may authenticate the transfer request. In some embodiments, ATM handler 118 may identify the ATM based on geolocation information associated with the user's (e.g., transferor's) client device 102. For example, ATM handler 118 may prompt geolocation device 112 of client device 102 to share a current location of client device 102. In some embodiments, ATM handler 118 may identify the ATM based on a transaction history associated with the user's (e.g., transferor's) account. For example, ATM handler 118 may identify an ATM based on one or more locations of one or more recent transactions. In some embodiments, ATM handler 118 may identify the ATM based on a preferred ATM specified in the user's account. In some embodiments, ATM handler 118 may identify that ATM based on personal identification information associated with the user. For example, ATM handler 118 may identify the ATM based on a home address or billing address associated with the user.

Account handler 116 may be configured to manage an account associated with each user. For example, account handler 116 may be configured to communicate with database 108. As illustrated, database 108 may include one or more user profiles 126 and ATM information 128.

Each user profile 126 may correspond to a respective user of the organization associated with organization computing system 104. Each user profile 126 may include one or more accounts 130, personal identification information 132, and preferences 134. Each account 130 may correspond to a respective financial account with the organization. For example, within user profile 126 may be one or more credit card accounts and one or more debit card accounts. Personal identification information 132 may include information associated with the user. In some embodiments, personal identification information 132 may include a name, home address, billing address, mailing address, telephone number, e-mail address, social security number, and the like. Preferences 134 may include a transfer threshold. The transfer threshold may protect one or more accounts 130 from fraudulent third parties. For example, upon a transfer request specifying a transfer amount in excess of the transfer threshold, organization computing system 104 may allow the transfer request upon the user taking further authentication steps specified by organization computing system 104.

ATM handler 118 may also communicate with database 108. For example, ATM handler 118 may communicate with database 108 to access ATM information 128. ATM information 128 may correspond to ATMs that may be eligible for further user authentication. ATM information 128 may include location information 136. Location information 136 may specify the geographic location of each ATM. For example, location information 136 may specify the address of each respective ATM. In some embodiments, ATM information 128 may further include one or more capabilities of each ATM. For example, if a customer wishes to authenticate at an ATM 106 using biometrics, ATM handler 118 may identify an ATM 128 that is able to perform biometric verification. In another example, ATM information 128 may include available house for each ATM 106. For example, if an ATM 106 is within a facility that closes at 10 pm, and the customer is performing this operation at 10:15 pm, ATM handler 118 may omit all ATMs that are inaccessible after 10 pm.

Still further, ATM handler 118 may factor into its selection transferor preference for ATM based on, for example, an explicit preference (e.g., through user's account) or an implicit preference (e.g., prior usage, recent usage, etc.). For example, even though a transferor may have many ATMs near their home, the transferor may prefer to go to an ATM 15 miles away because it is next to the transferor's office. In another example, if a transferor has a vacation home in another state, they might frequent ATMs near that vacation home during the summer, even though the address on their account is far away.

Still further, if a transferor does not have location services available on their client device, ATM handler 118 may incorporate the transferor's recent in-person transaction data to detect where they are located. For example, if the transferor made a transaction at a grocery store within the past three hours, ATM handler 118 may suggest an ATM near that grocery store. In another example, if the transfer has a pattern of repeat transactions (the same coffee shop every morning), ATM handler 118 may select an ATM near the coffee shop.

ATMs 106 may be representative of ATMs that are eligible for further user authentication. Each ATM 106 may include one or more cameras 122 and a biometric reader 124. One or more cameras 122 may be configured to capture one or more streams of video of a user accessing ATM 106. In some embodiments, ATM 106 may transfer the one or more streams of video to organization computing system 104. Biometric reader 124 may be configured to capture one or more biometric readings of a user. Such biometric readings may include, but are not limited to, a fingerprint, palm veins, facial recognition, hand geometry, iris recognition, retina recognition, voice recognition, and the like.

Figure 2:
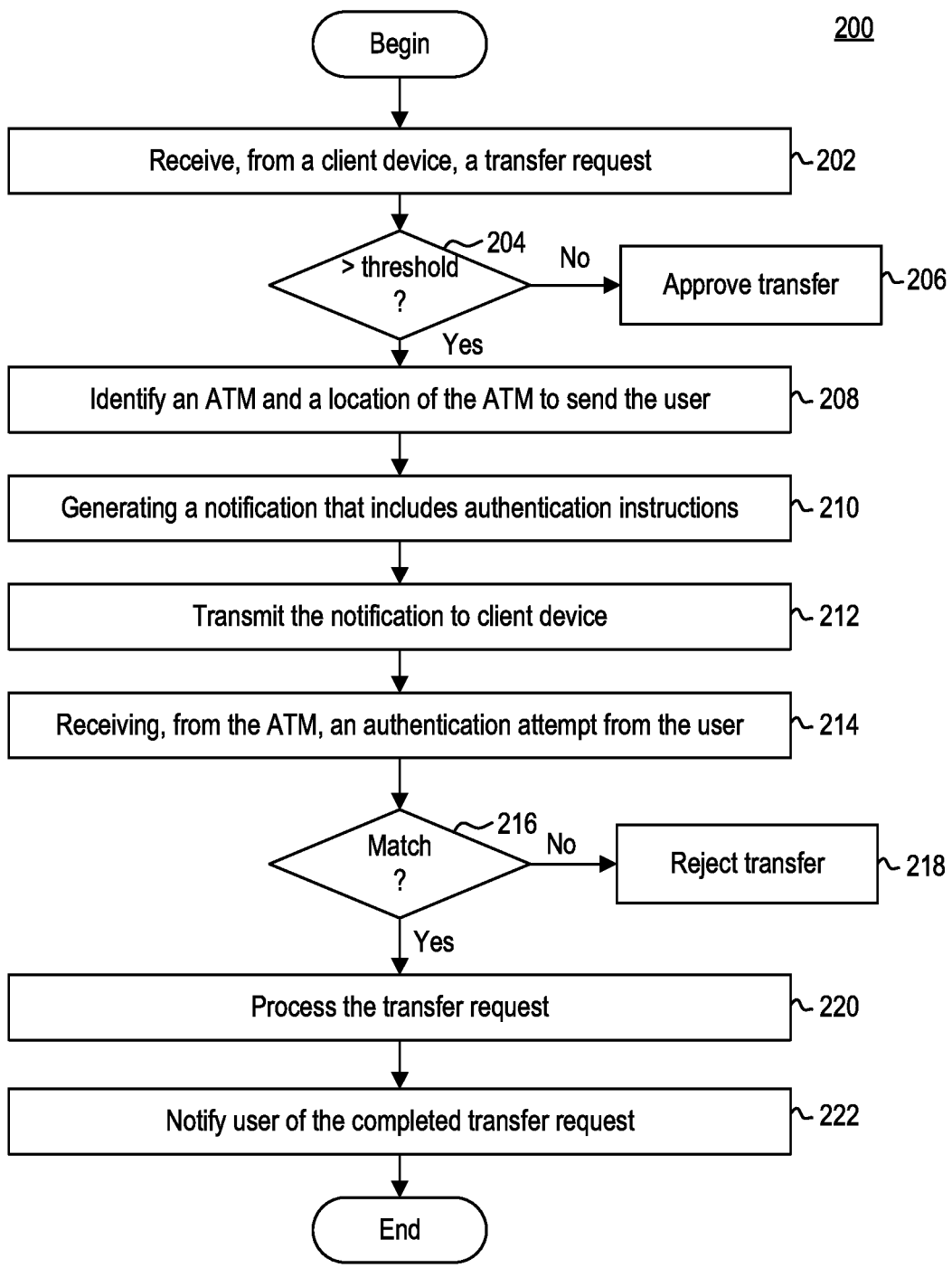
FIG. 2 is a flow diagram illustrating a method of authenticating a transfer request, according to one exemplary embodiment.

FIG. 2 is a flow diagram illustrating a method 200 of authenticating a transfer request, according to one exemplary embodiment. Method 200 may begin at step 202.

At step 202, organization computing system 104 may receive, from client device 102, a transfer request. The transfer request may include at least an account associated with a transferor (i.e., user of client device 102), an account associated with a transferee, and a transfer amount. In some embodiments, organization computing system 104 may receive the transfer request via application 110 executing on client device 102.

At step 204, organization computing system 104 may determine whether the transfer amount exceeds a predetermined threshold. For example, in some embodiments, transfer agent 120 may determine whether the transfer amount exceeds a predetermined threshold specified in preferences 134 of user's profile 126. In some embodiments, transfer agent 120 may determine whether the transfer amount exceeds a predetermined threshold specified by organization associated with organization computing system 104.

If, at step 204, organization computing system 104 determines that the transfer amount does not exceed a predetermined threshold, then method 200 proceeds to step 206. At step 206, organization computing system 104 may approve the transfer.

If, however, at step 204, organization computing system 104 determines that the transfer amount does exceed a predetermined threshold, then method 200 proceeds to step 208. At step 208, organization computing system 104 may identify an ATM to send the user for further authentication. In some embodiments, ATM handler 118 may identify the ATM based on geolocation information associated with the user's (e.g., transferor's) client device 102. For example, ATM handler 118 may prompt geolocation device 112 of client device 102 to share a current location of client device 102. In some embodiments, ATM handler 118 may identify the ATM based on a transaction history associated with the user's (e.g., transferor's) account. For example, ATM handler 118 may identify an ATM based on one or more locations of one or more recent transactions. In some embodiments, ATM handler 118 may identify the ATM based on a preferred ATM specified in the user's account. In some embodiments, ATM handler 118 may identify that ATM based on personal identification information associated with the user. For example, ATM handler 118 may identify the ATM based on a home address or billing address associated with the user.

At step 210, organization computing system 104 may generate a notification that includes authentication instructions. For example, transfer agent 120 may generate a notification with instructions as to how user may authenticate the transfer request. In some embodiments, the notification may include a location of the specific ATM at which the user may authenticate. In some embodiments, the notification may further include a time period during which the user has to authenticate. For example, after expiration of the time period, the user may not be able to authenticate the transfer request. Accordingly, the user would have to re-initiate the transfer request.

At step 212, organization computing system 104 may transmit the notification to client device 102. For example, transfer agent 120 may transmit the notification to client device 102 via application 110. Client device 102 may push the notification to client device 102 via graphical user interface (GUI) of client device 102.

At step 214, organization computing system 104 may receive, from an ATM 106, an authentication attempt corresponding to an account of the user. In some embodiments, the authentication attempt may include at least personal identification information associated with the transferor. For example, the personal identification information may include one or more of an account number, a personal identification number (PIN), a passcode, a social security number, and the like. In some embodiments, the authentication attempt may further include one or more video streams. For example, the one or more video streams may include video of the user attempting the authentication attempt. In some embodiments, the authentication attempt may further include a biometric reading. For example, ATM 106 may transfer one or more biometric readings corresponding to one or more of a fingerprint, palm veins, facial recognition, hand geometry, iris recognition, retina recognition, voice recognition, and the like.

At step 216, organization computing system 104 may determine whether there is a match between information in the authentication attempt and information in user's profile 126. For example, transfer agent 120 may compare the information transmitted in the authentication attempt to information associated with the user. In some embodiments, transfer agent 120 may compare personal identification information in the authentication attempt to personal identification information 132 in database 108. In some embodiments, transfer agent 120 may compare one or more facial features in the one or more video streams to one or more facial features stored in personal identification information 132 in database 108. In some embodiments, transfer agent 120 may compare one or more biometric readings to one or more biometric readings stored in database 108.

If, at step 216, organization computing system 104 determines that there is not a match between information in the authentication attempt and information in user's profile 126, then method 200 proceeds to step 218. At step 218, organization computing system 104 may reject the transfer request.

If, however, at step 216, organization computing system 104 determines that there is a match between information in the authentication attempt and information in user's profiler 126, then method 200 proceeds to step 220. At step 220, organization computing system 104 may process the transfer request. For example, transfer agent 120 may debit, from the transferor's account, the transfer amount, and credit, to the transferee's account, the transfer amount.

At step 222, organization computing system 104 may notify the user of the completed transfer request. In some embodiments, transfer agent 120 may generate a second notification message to be transmitted to client device 102. The second notification message may include a confirmation of the transfer.

Figure 3:
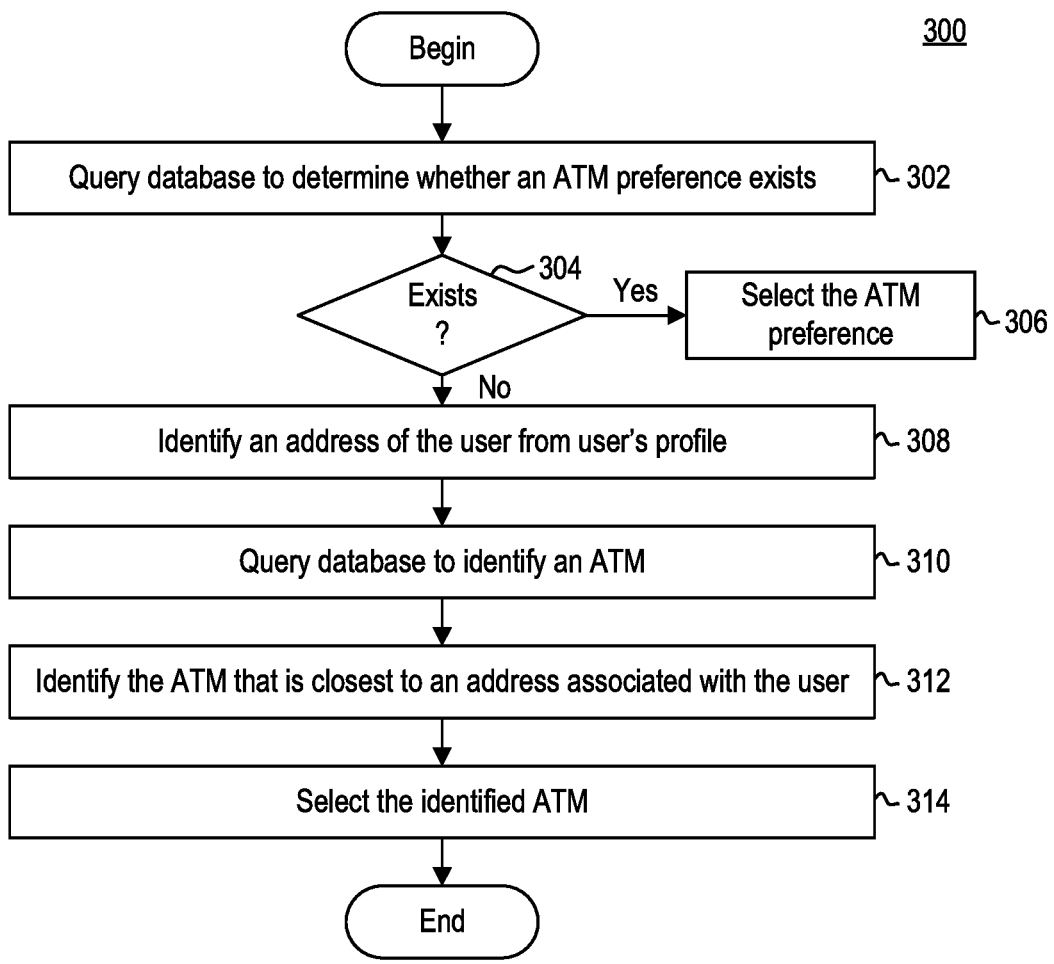
FIG. 3 is a flow diagram illustrating a method of locating an automated teller machine (ATM), according to one exemplary embodiment.

FIG. 3 is a flow diagram illustrating a method 300 of locating an automated teller machine (ATM), according to one exemplary embodiment. Method 300 may begin at step 302.

At step 302, organization computing system 104 may query database 108 to determine whether the transferor (e.g., user) has an ATM preference. For example, transfer agent 120 may query database 108 with user identification information (e.g., user name, passcode, PIN, social security number, etc.) to determine whether the user has specified a preferred ATM in preferences 134.

At step 304, organization computing system 104 may determine whether the transferor has an ATM preference based on the query. If, at step 304, organization computing system 104 determines that the transferor has an ATM preference specified in one or more preference 134, then method 300 proceeds to step 306. At step 306, organization computing system 104 may select the ATM specified in preferences 134. For example, transfer agent 120 may notify user to navigate to the preferred ATM for further authentication.

If, however, at step 304, organization computing system 104 determines that the transferor does not have an ATM preference (i.e., did not specify an ATM in preferences 134), then method 300 proceeds to step 308. At step 308, organization computing system 104 may identify an address of the user from user's profile 126. In some embodiments, transfer agent 120 may identify a home address specified in personal identification information 132. In some embodiments, transfer agent 120 may identify a billing address specified in personal identification information 132. In some embodiments, transfer agent 120 may identify a mailing address specified in personal identification information 132.

At step 310, organization computing system 104 may query database 108 to identify an ATM closest to the identified address from step 308. For example, ATM handler 202 may query database 108 to determine an ATM 106 closest to the identified address using ATM information 128. In some embodiments, ATM handler 118 may narrow the query, by specifying that ATM 106 be equipped with one or more cameras (e.g., cameras 122). In some embodiments, ATM handler 118 may narrow the query, by specifying that ATM 106 be equipped with a biometric reader (e.g., biometric reader 124).

At step 312, organization computing system 104 may identify the ATM that is closest to the user's address. For example, organization computing system 104 may identify the ATM based on the query above in step 310. At step 314, organization computing system 104 may select the identified ATM.

Figure 4:
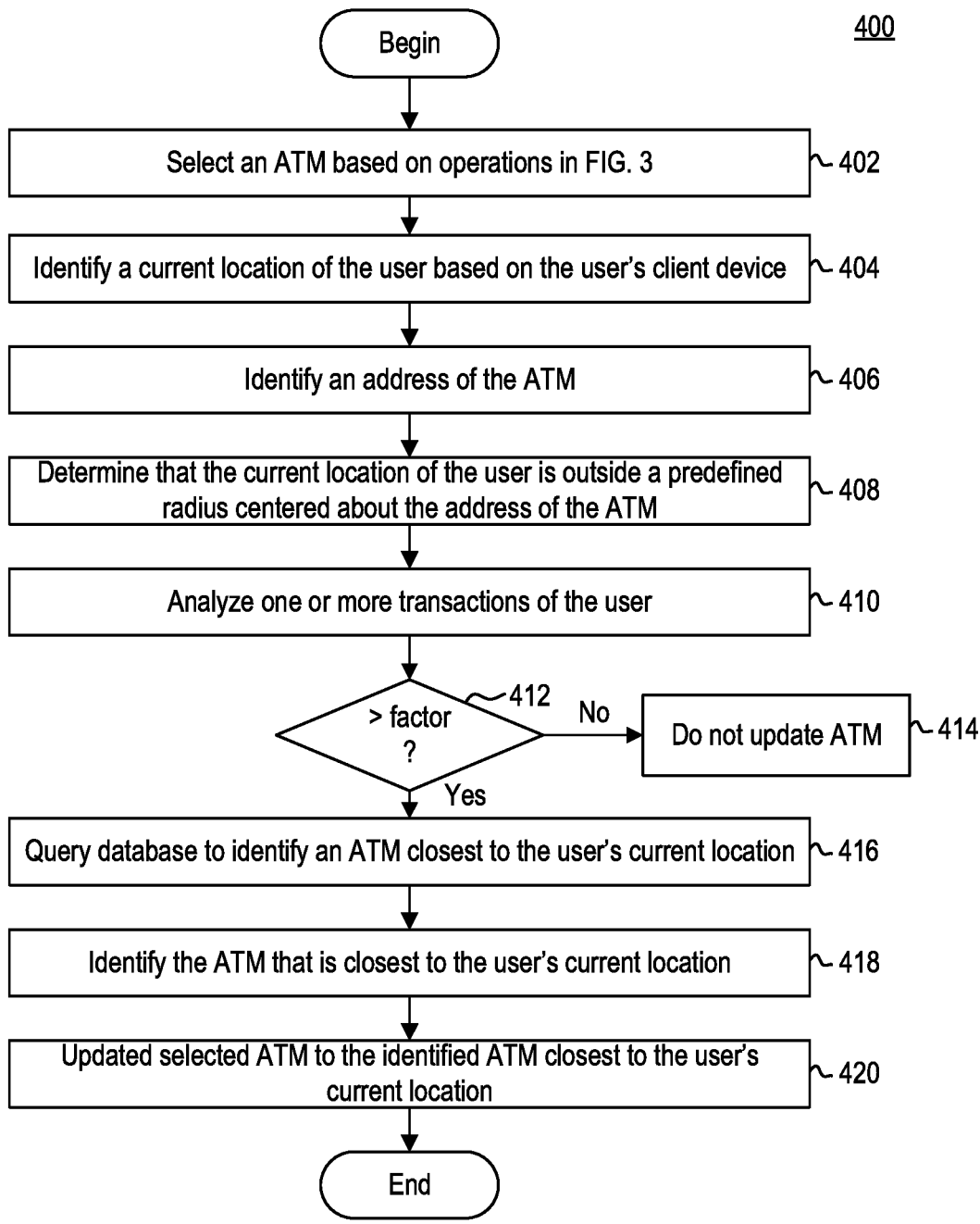
FIG. 4 is a flow diagram illustrating a method of authenticating a transfer request, according to one exemplary embodiment.

FIG. 4 is a flow diagram illustrating a method 400 of locating an ATM, according to one exemplary embodiment. Method 400 may begin at step 402.

At step 402, organization computing system 104 may select an initial ATM based on the operations discussed above in conjunction with FIG. 3. For example, organization computing system 104 may select the initial ATM based on an address specified in user's profile 126.

Those skilled in the art may immediately recognize, however, that a user may attempt a transfer request when the user is not currently located in the user's typical location. For example, the user may be traveling in a location of significant distance from the user's typical location. In such situations, the user would be stopped from transferring larger amounts (i.e., above the transfer threshold), because the user would be simply unable to visit an ATM. The operations discussed below in method 400 anticipate such scenario.

At step 404, organization computing system 104 may identify a current location of the user. For example, transfer agent 120 may communicate with client device 102 to request a current location of computing device 102. Transfer agent 120 may interface with client device 102 via application 110. Client device 102 may share a current location with transfer agent 120 via geolocation device 112, and transmit the current location to transfer agent 120.

At step 406, organization computing system 104 may identify the determined address from step 312 in method 300. For example, transfer agent 120 may identify the location of the identified initial ATM at which transfer agent 120 will instruct user to authentication.

At step 408, organization computing system 104 may determine that the current location of the user is outside a predefined radius centered about the address of the initial ATM. For example, transfer agent 120 may define a circle having a center positioned at the address of the initial ATM. If transfer agent 120 determines that client device's 102 current location is outside the circle (i.e., beyond a threshold distance from the initial ATM), then transfer agent 120 may determine that the user will be unable to authenticate based off the current location.

At step 410, organization computing system 104 may analyze one or more recent transactions of the user. For example, transfer agent 120 may analyze one or more recent transactions of the user in one or more accounts 130 to verify that the user is indeed in the location shared by client device 120. Transfer agent 120 may identify one or more locations of one or more recent transactions of the user. From the one or more recent transactions, transfer agent 120 may generate a confidence factor corresponding to a level of confidence that the user is indeed in the location shared by client device 102.

At step 412, organization computing system 104 may determine whether the one or more transactions exceed a predetermined confidence threshold. If, at step 412, organization computing system 104 determines that the confidence level does not exceed the predetermined confidence threshold, then method 400 proceeds to step 414. At step 414, organization computing system 104 may not update the ATM at which the user is to authenticate. For example, transfer agent 120 may determine that there is a high likelihood that the transfer request is fraudulent.

If, however, at step 412, organization computing system 104 determines that the confidence level does exceed the predetermined confidence level, then method 400 proceeds to step 416. At step 416, organization computing system 104 may query database 108 to identify an ATM closest to the user's current location. For example, ATM handler 118 may query database 108 to determine an ATM 106 closest to the current location of client device 102 using ATM information 128. In some embodiments, ATM handler 118 may narrow the query, by specifying that ATM 106 be equipped with one or more cameras (e.g., cameras 122). In some embodiments, ATM handler 118 may narrow the query, by specifying that ATM 106 be equipped with a biometric reader (e.g., biometric reader 124).

At step 418, organization computing system 104 may identify the ATM that is closest to the current location of client device 102. For example, organization computing system 104 may identify the ATM based on the query above in step 416. At step 420, organization computing system 104 may update the selected ATM to the identified ATM based on the current location of client device 102.

Figure 5:
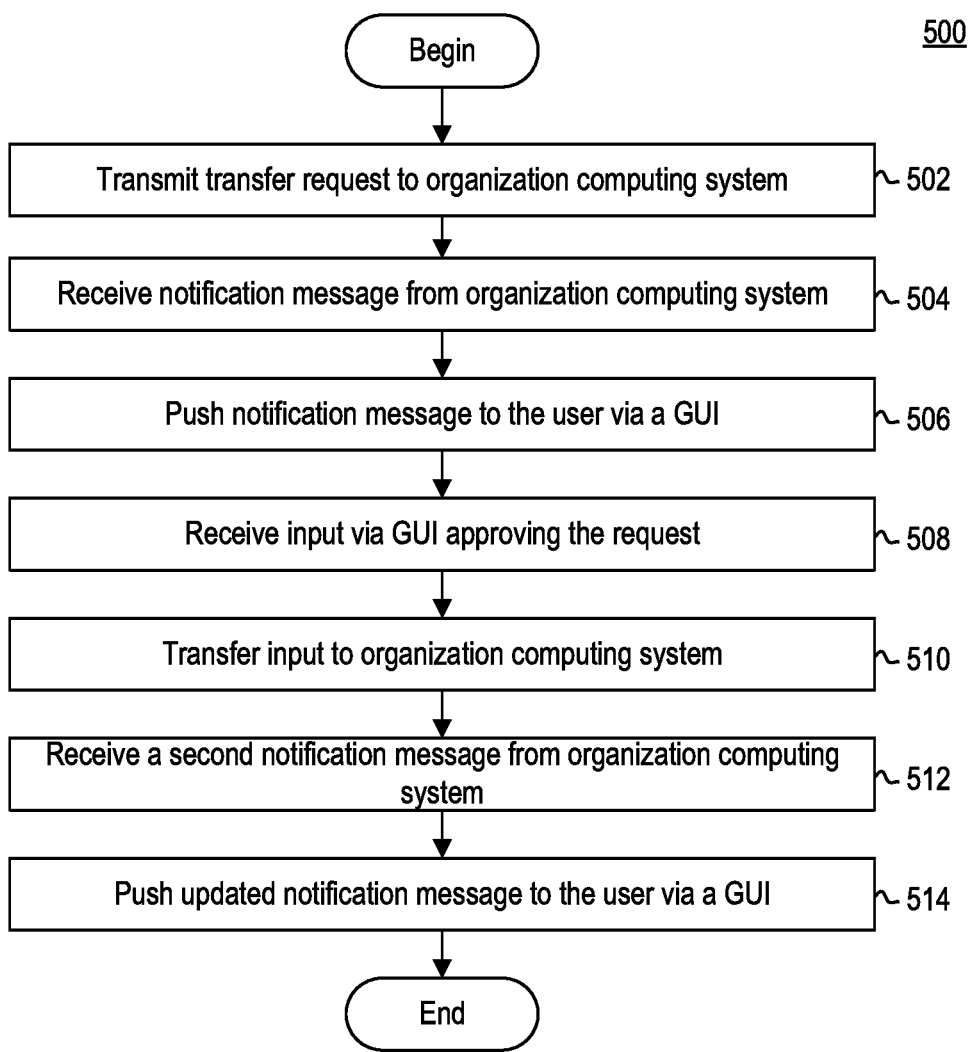
FIG. 5 is a flow diagram illustrating a method of authenticating a transfer request, according to one exemplary embodiment.

FIG. 5 is a flow diagram illustrating a method 500 of authentication a transfer request, according to one embodiment. Method 500 may begin at step 502.

At step 502, client device 102 may transmit a transfer request to organization computing system 104. For example, user of client device 102 may access functionality of organization computing system 104 via application 110 executing thereon. Via application 110, user may initiate a transfer request from an account associated with the user to an account of a third party. Accordingly, the transfer request may include at least an account of the transferor (e.g., user), an account of the transferee (e.g., third party), and a transfer amount.

At step 504, client device 102 may receive a first notification message from organization computing system. The first notification message may include an authentication request. The authentication request may include instructions directing the user to a specified ATM, at which the user may input authentication information.

At step 506, client device 102 may push the notification message to the user via a first graphical user interface (GUI). For example, client device 102 may generate and render a first GUI to be displayed via a display of client device 102, such that notification message may be pushed, or presented, to user of client device 102. In some embodiments, the notification message may include an acceptance button and a deny button. The acceptance button may correspond to an acceptance of the authentication request. The deny button may correspond to a denial of the authentication request.

At step 508, client device 102 may receive input via the first GUI corresponding to an approval of the request. For example, client device 102 may receive input via the first GUI as a result of a user interacting with the acceptance button in the notification message displayed thereon.

At step 510, client device 102 may transfer the input to organization computing system 104. For example, client device 102 may translate the user's action to instructions that may be transmitted across network 105 to organization computing system 104.

At step 512, client device 102 may receive a second notification from organization computing system 104. The second notification may be triggered as a result of a successful authentication attempt at the specified ATM. For example, the second notification may include a confirmation of the transfer request based on the successful authentication of the user.

At step 514, client device 102 may push the second notification to the user via a second GUI. For example, client device 102 may generate and render a second GUI to be displayed via a display of client device 102, such that the notification may be presented, or pushed, to user of client device 102.

Figure 6:
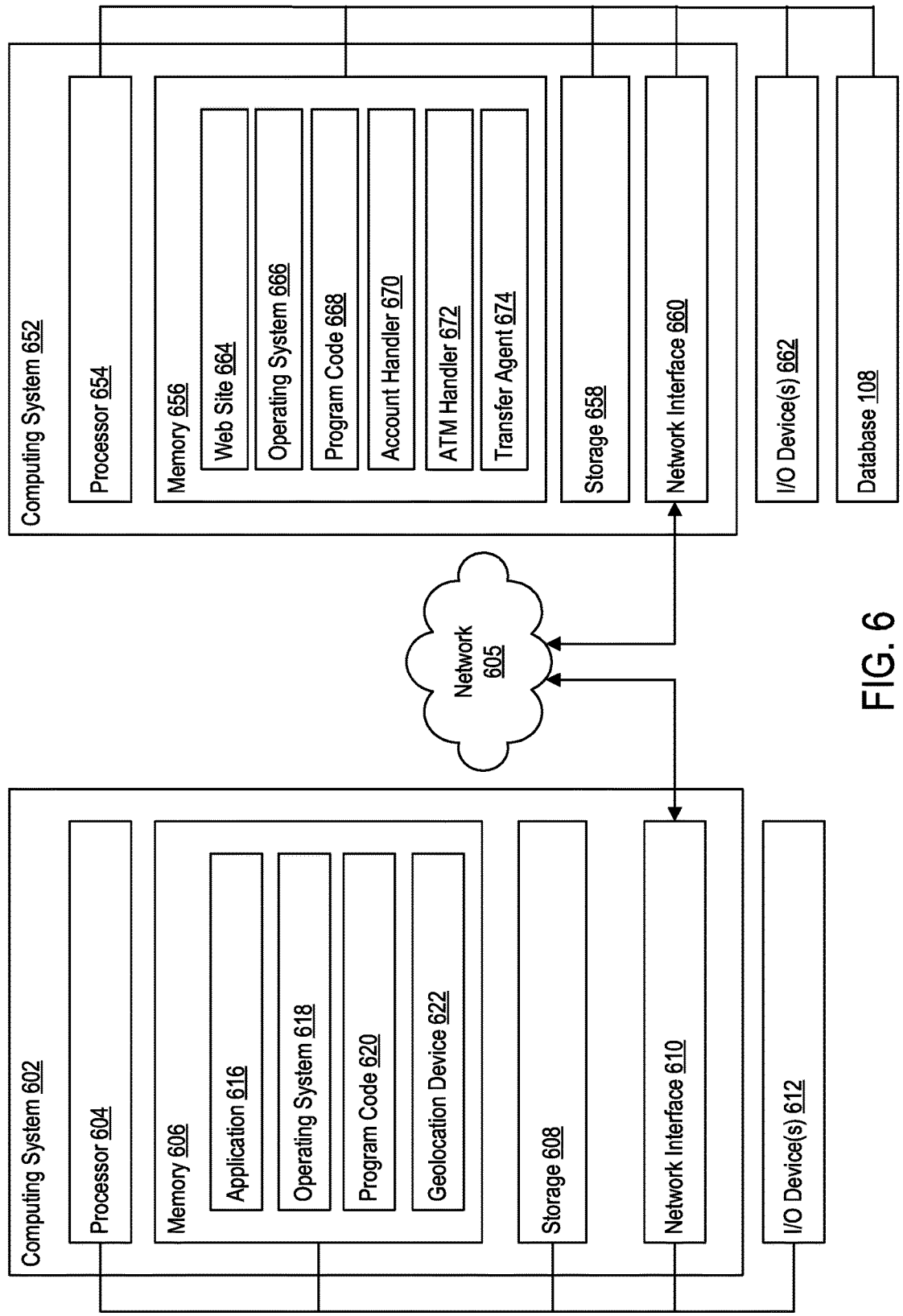
FIG. 6 is a block diagram illustrating a computing environment, according to one embodiment.

FIG. 6 is a block diagram illustrating an exemplary computing environment 600, according to some embodiments. Computing environment 600 includes computing system 602 and computing system 652. Computing system 602 may be representative of client device 102. Computing system 652 may be representative of organization computing system 104.

Computing system 602 may include a processor 604, a memory 606, a storage 608, and a network interface 610. In some embodiments, computing system 602 may be coupled to one or more I/O device(s) 612 (e.g., keyboard, mouse, etc.).

Processor 604 may retrieve and execute program code 620 (i.e., programming instructions) stored in memory 606, as well as stores and retrieves application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 is configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 616, operating system 618, program code 620, and geolocation agent 622. Program code 620 may be accessed by processor 604 for processing (i.e., executing program instructions). Program code 620 may include, for example, executable instructions for communicating with computing system 652 to display one or more pages of website 664. Application 616 may enable a user of computing system 602 to access a functionality of computing system 652. For example, application 616 may access content managed by computing system 652, such as website 664. The content that is displayed to a user of computing system 602 may be transmitted from computing system 652 to computing system 602, and subsequently processed by application 616 for display through a graphical user interface (GUI) of computing system 602.

Geolocation agent 622 may correspond to geolocation agent 112. Geolocation agent 622 may be configured to track a location of computing system 602. For example, when enabled, geolocation agent 622 may utilize one or more GPS modules to identify a current location of computing system 602.

Computing system 652 may include a processor 654, a memory 656, a storage 658, and a network interface 660. In some embodiments, computing system 652 may be coupled to one or more I/O device(s) 662. In some embodiments, computing system 652 may be in communication with database 108.

Processor 654 may retrieve and execute program code 668 (i.e., programming instructions) stored in memory 656, as well as stores and retrieves application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 allows computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include website 664, operating system 666, program code 668, account handler 670, ATM handler 672, and transfer agent 674. Program code 668 may be accessed by processor 654 for processing (i.e., executing program instructions). Program code 668 may include, for example, executable instructions configured to perform steps discussed above in conjunction with FIGS. 2-5. As an example, processor 654 may access program code 668 to perform operations for authenticating a transfer request. In another example, processor 654 may access program code 668 to perform operations for locating an ATM for the transfer request. Website 664 may be accessed by computing system 602. For example, website 664 may include content accessed by computing system 602 via a web browser or application.

Transfer agent 674 may be configured to manage one or more transfer requests received from computing system 602. For example, transfer agent 674 may be configured to facilitate the transfer of funds from a user's account to a third party. Generally, a transfer request may include an account of the transferor, an account of the transferee, and an amount to be transferred. In some embodiments, transfer agent 120 may be configured to determine if the amount to be transferred is greater than a threshold mount. For example, the threshold amount may be an amount predesignated by an organization associated with organization computing system or an amount predesignated by the transferor.

ATM handler 672 may be configured to identify an ATM at which transferor may authenticate the transfer request. In some embodiments, ATM handler 672 may identify the ATM based on geolocation information provided by geolocation device 622. In some embodiments, ATM handler 672 may identify the ATM based on a transaction history associated with a user in database 108. In some embodiments, ATM handler 672 may identify the ATM based on a preferred ATM specified in database 108. In some embodiments, ATM handler 672 may identify that ATM based on personal identification information associated with the user in database 108.

Account handler 670 may be configured to manage an account associated with each user. For example, account handler 670 may be configured to communicate with database 108.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of authenticating a transfer request, comprising:
    receiving, by a computing system, a first transfer request from a client device, the first transfer request comprising an originating account, a first target account, and a first monetary amount to be transferred from the originating account to the first target account;
    determining, by the computing system, that the first monetary amount specified in the first transfer request does not exceed a threshold;
    based on the determining, processing, by the computing system, the first transfer request;
    receiving, by the computing system, a second transfer request from the client device, the second transfer request comprising the originating account, a second target account, and a second monetary amount to be transferred from the originating account to the second target account;
    determining, by the computing system, that the second monetary amount specified in the second transfer request exceeds the threshold;
    identifying, by the computing system, an automated teller machine (ATM) based on at least location information associated with a user of the client device;
    prompting, by the computing system, the user to authenticate the second transfer request at the identified ATM by transferring a message to the client device to be displayed thereon;
    receiving, by the computing system, an authentication attempt of the user from the ATM, comprising:
        receiving biometric information captured by a biometric reader of the ATM;
    comparing, by the computing system, authentication information in the authentication attempt to personal identification information associated with the user, the comparing comprising:
        comparing the biometric information captured by the biometric reader to biometric information stored in a user account;
    determining, by the computing system, that the authentication information at least partially matches personal identification information associated with the user; and
    based on the determining, processing, by the computing system, the second transfer request initiated at the client device.

2. The method of claim 1, wherein determining, by the computing system, that the second monetary amount specified in the second transfer request exceeds the threshold, comprises:
    referencing one or more preferences stored in an account of the user;
    identifying that the user has specified the threshold for all transfer requests; and
    comparing the monetary amount specified in the second transfer request to the threshold.

3. The method of claim 1, wherein identifying, by the computing system, the ATM based on at least the location information associated with the user of the client device, comprises:
    referencing one or more preferences stored in an account of the user;
    identifying that the user has specified the ATM as a preferred authentication ATM; and
    selecting the specified ATM as the ATM.

4. The method of claim 1, wherein identifying, by the computing system, the ATM based on at least the location information associated with the user of the client device, comprises:
    identifying address information associated with the user;
    querying a database to identify one or more candidate ATMs proximate to the identified address information; and
    selecting a candidate ATM of the one or more candidate ATMs as the ATM.

5. The method of claim 1, wherein identifying, by the computing system, the ATM based on at least the location information associated with the user of the client device, comprises:
    selecting an initial ATM as the ATM based on at least one of a user's preference or address information associated with the user;

prompting the client device to share a current location of the client device;
receiving the current location of the client device;
determining that the current location of the client device is outside of a predefined radius centered about a location of the user's preference or the address information associated with the user;
analyzing one or more locations associated with one or more transactions of the user to generate a confidence factor;
determining that the confidence factor is greater than a predetermined threshold; and
modifying the initial ATM to an updated ATM proximate to the current location of the client device.

6. A system, comprising:
a processor in communication with a client device associated with a user and one or more automated teller machines (ATMs); and
a memory having programming instructions stored thereon, which, when executed by the processor, performs an operation, comprising:
receiving a first transfer request from the client device, the first transfer request comprising an originating account, a first target account, and a first monetary amount to be transferred from the originating account to the first target account;
determining that the first monetary amount specified in the first transfer request does not exceed a threshold;
based on the determining, processing, the first transfer request;
receiving a second transfer request from the client device, the second transfer request comprising the originating account, a second target account, and a second monetary amount to be transferred from the originating account to the second target account;
determining that the second monetary amount specified in the second transfer request exceeds the threshold;
identifying an ATM of the one or more ATMs based on at least location information associated with the user of the client device;
prompting the user to authenticate the second transfer request at the identified ATM by transferring a message to the client device to be displayed thereon;
receiving an authentication attempt of the user from the ATM, comprising:
receiving biometric information captured by a biometric reader of the ATM;
comparing authentication information in the authentication attempt to personal identification information associated with the user, the comparing comprising:
comparing the biometric information captured by the biometric reader to biometric information stored in a user account;
determining that the authentication information at least partially matches personal identification information associated with the user; and
based on the determining, processing the second transfer request initiated at the client device.

7. The system of claim 6, wherein identifying the ATM based on at least the location information associated with the user of the client device, comprises:
referencing one or more preferences stored in an account of the user;
identifying that the user has specified the ATM as a preferred authentication ATM; and
selecting the specified ATM as the ATM.

8. The system of claim 6, wherein identifying the ATM based on at least the location information associated with the user of the client device, comprises:
identifying address information associated with the user;
querying a database to identify one or more candidate ATMs proximate to the identified address information; and
selecting a candidate ATM of the one or more candidate ATMs as the ATM.

9. The system of claim 6, wherein identifying the ATM based on at least the location information associated with the user of the client device, comprises:
selecting an initial ATM as the ATM based on at least one of a user's preference or address information associated with the user;
prompting the client device to share a current location of the client device;
receiving the current location of the client device;
determining that the current location of the client device is outside of a predefined radius centered about a location of the user's preference or the address information associated with the user;
analyzing one or more locations associated with one or more transactions of the user to generate a confidence factor;
determining that the confidence factor is greater than a predetermined threshold; and
modifying the initial ATM to an updated ATM proximate to the current location of the client device.

10. A method of authenticating a transfer request, comprising:
transferring, by a client device, a first transfer request to a computing system, the first transfer request comprising an originating account, a first target account, and a first monetary amount to be transferred from the originating account to the first target account;
receiving, from the computing system, a first notification message comprising a confirmation of the first transfer request, responsive to the computing system determining that the first monetary amount does not exceed a threshold amount;
transferring, by the client device, a second transfer request to the computing system, the second transfer request comprising the originating account, a second target account, and a second monetary amount to be transferred from the originating account to the second target account;
receiving, from the computing system, a second notification message comprising an authentication request for a user of client device to authenticate the second transfer request at a specified automated teller machine (ATM), responsive to the computing system determining that the second monetary amount exceeds the threshold amount, the authentication request prompting the user to provide biometric information to a biometric reader of the ATM;
generating, by the client device, a first graphical user interface (GUI) comprising the first notification message;
displaying, by the client device, the first GUI via a display of the client device;
receiving, via the first GUI of the client device, an input corresponding to an acceptance of the authentication request;
transmitting, by the client device, the input to the computing system;

receiving, from the computing system, a second notification message comprising a confirmation of the second transfer request based on a successful authentication of the user based on a comparison between the biometric information captured by the biometric reader and biometric information stored in a user account;

generating, by the client device, a second GUI comprising the second notification message; and displaying, by the client device, the second GUI via the display of the client device.

11. The method of claim 10, wherein the first GUI comprises:

an acceptance button corresponding to an acceptance of the authentication request; and a deny button corresponding to a denial of the authentication request.

12. The method of claim 10, further comprising:

receiving, from the computing system, a request to share a current location; and transmitting, by the client device to the computing system, the current location of the user.

* * * * *